US009032603B2

(12) United States Patent
Yamamoto (10) Patent No.: US 9,032,603 B2
(45) Date of Patent: May 19, 2015

(54) AUTOMATED ASSEMBLY APPARATUS AND METHOD OF ASSEMBLING COMPONENTS BY USING AUTOMATED ASSEMBLY APPARATUS

(75) Inventor: Yuya Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/528,498

(22) Filed: Jun. 20, 2012

(65) Prior Publication Data

US 2012/0324693 A1     Dec. 27, 2012

(30) Foreign Application Priority Data

Jun. 23, 2011   (JP) .................................. 2011-139705

(51) Int. Cl.
*B25J 9/16* (2006.01)
*G05B 15/00* (2006.01)
*B23P 19/10* (2006.01)

(52) U.S. Cl.
CPC ............. *B23P 19/105* (2013.01); *B25J 9/1687* (2013.01); *G05B 2219/40032* (2013.01); *Y10S 901/34* (2013.01)

(58) Field of Classification Search
CPC .......... B23P 19/10–19/12; B25J 9/10–9/1015; B25J 9/1633; B25J 9/1687
USPC ................... 29/407.1, 407.08, 718, 525, 790, 29/407.07, 407.09, 713; 901/34, 10, 39, 9; 318/568.16, 568.17, 568.18, 568.21; 33/644; 414/589, 590, 732, 730; 700/245, 262

See application file for complete search history.

(56) References Cited

U.S. PATENT DOCUMENTS

| | | | |
|---|---|---|---|
| 3,984,006 A * | 10/1976 | Takeyasu et al. ............. 414/589 |
| 4,694,230 A * | 9/1987 | Slocum et al. ........... 318/568.17 |
| 4,707,907 A * | 11/1987 | Ivanov ............................ 29/525 |
| 5,031,304 A * | 7/1991 | Shepard et al. ................. 29/700 |
| 5,207,554 A * | 5/1993 | Asakawa et al. ........... 414/744.6 |
| 6,141,863 A * | 11/2000 | Hara et al. ...................... 29/714 |
| 6,553,652 B2 * | 4/2003 | Sakakibara et al. ............ 29/709 |
| 7,177,722 B2 * | 2/2007 | Kato et al. ..................... 700/262 |
| 8,424,182 B2 * | 4/2013 | Sato et al. .................. 29/407.01 |
| 2005/0113971 A1 * | 5/2005 | Zhang et al. .................. 700/245 |

FOREIGN PATENT DOCUMENTS

| JP | H07-241733 A | 9/1995 |
|---|---|---|
| JP | 3288518 B2 | 6/2002 |
| JP | 2004-167651 A | 6/2004 |
| JP | 2004-325328 A | 11/2004 |

* cited by examiner

*Primary Examiner* — David Bryant
*Assistant Examiner* — Jun Yoo
(74) *Attorney, Agent, or Firm* — Canon USA Inc IP Division (57) ABSTRACT

While a second component is brought into contact with a first component, the first component and the second component are rotated with respect to each other around a specific rotation axis, and rotation of the first component and the second component is stopped when a moment created around the rotation axis exceeds a predetermined threshold.

3 Claims, 11 Drawing Sheets

AUTOMATED ASSEMBLY APPARATUS AND METHOD OF ASSEMBLING COMPONENTS BY USING AUTOMATED ASSEMBLY APPARATUS

BACKGROUND OF THE INVENTION

1. Field of the Invention

The present invention relates to an automated assembly apparatus that assembles components using a robot and also relates to a method of assembling components by using the automated assembly apparatus.

2. Description of the Related Art

Figure 10:
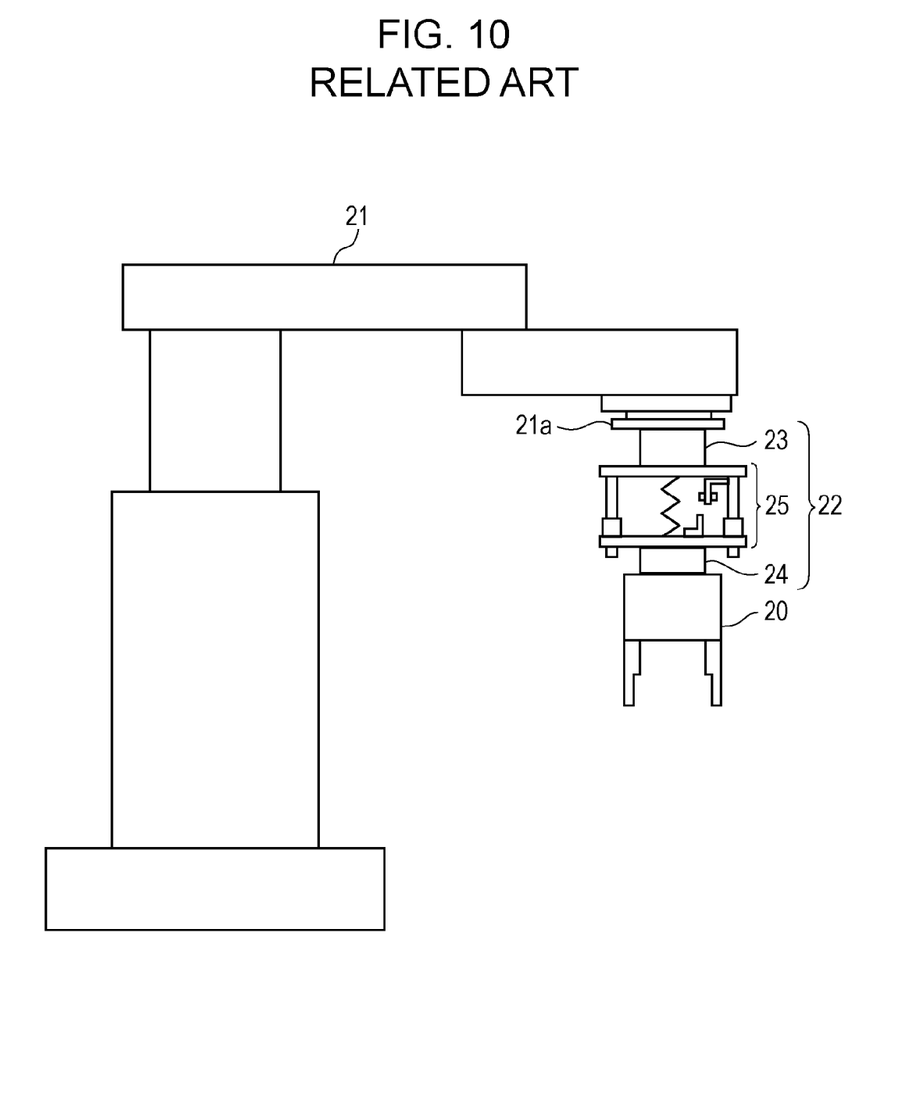
FIG. 10 is a front view of an automated component-assembly apparatus known in the art.
Figure 11:
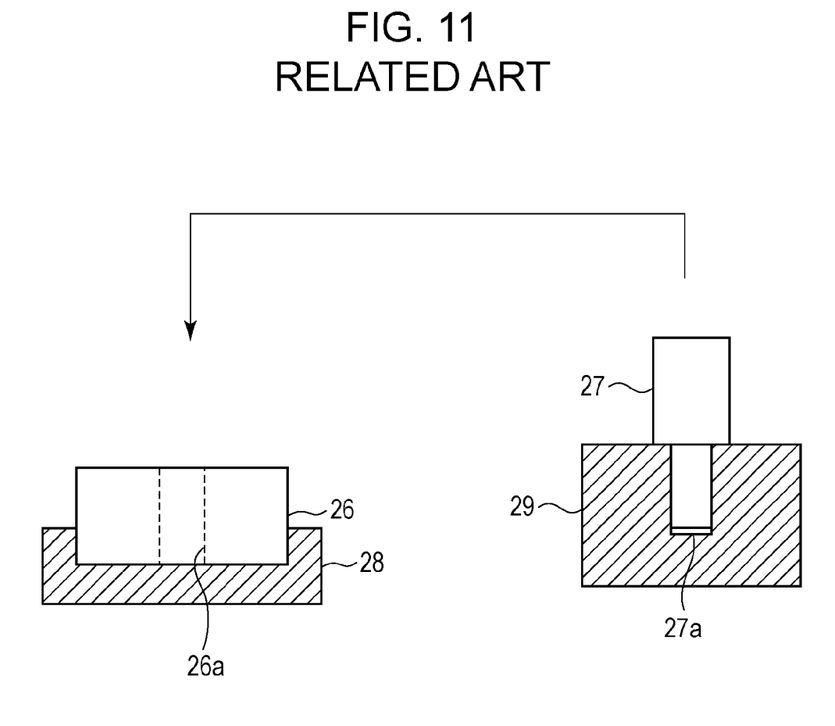
FIG. 11 is a sectional view of positioning and component feeding mechanisms known in the art for components to be assembled.
Figure 12A:
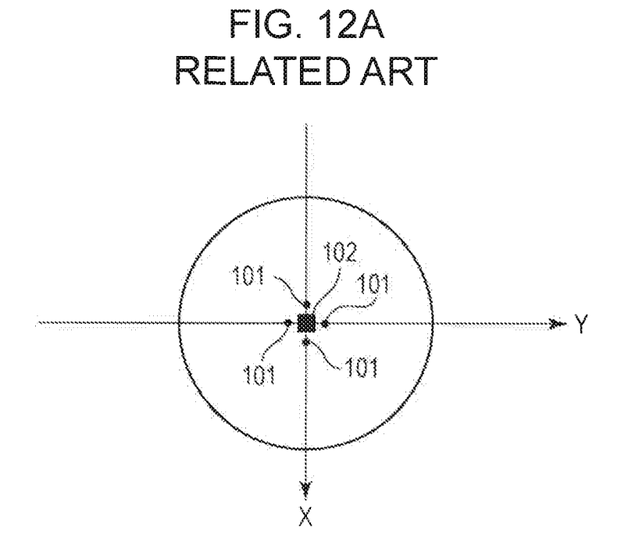
FIGS. 12A and 12B illustrate a typical force sensor known in the art.
Figure 12B:
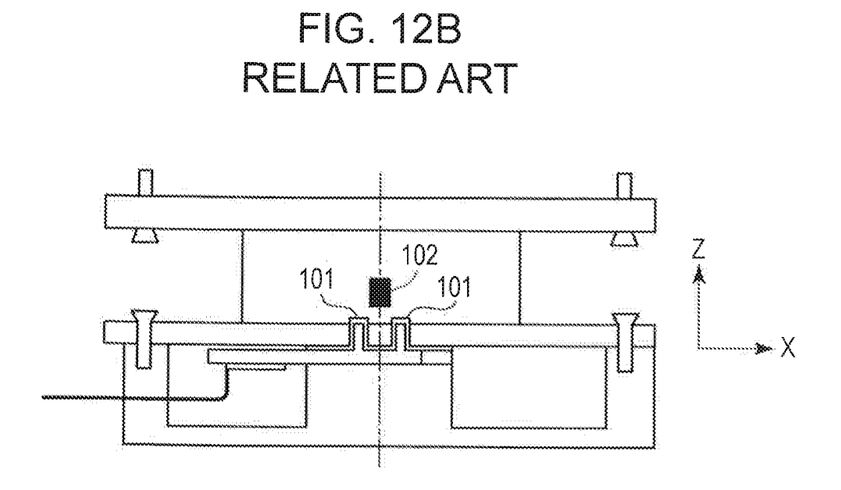

FIGS. 10 and 11 illustrate an automated assembly apparatus disclosed in Japanese Patent No. 03288518 and FIGS. 12A and 12B illustrate a typical force sensor. FIG. 10 illustrates a basic configuration of the automated assembly apparatus when seen from the front. FIG. 11 is a schematic diagram of components that are to be assembled together, one of the components being placed on a positioning mechanism, the other being fed by a component feeding mechanism.

As illustrated in FIG. 10, the automated assembly apparatus includes a robot 21 and a grasping mechanism 20. The robot 21 is a type of robot that is generally called a "Selective Compliance Assembly Robot Arm" or SCARA. The robot 21 has four degrees of freedom, that is, abilities to horizontally move along X and Y axes, which are horizontally orthogonal to each other, an ability to vertically move along a Z axis, which is a vertical axis, and an ability to perform horizontal rotation θ of a wrist around the vertical axis Z. The robot 21 is controlled by a controller, which is not illustrated.

An end portion 21a of the robot 21 and the grasping mechanism 20 are coupled together by a coupling mechanism 22. The coupling mechanism 22 includes a four-axis force sensor 23, a remote center compliance (also written as an RCC, below) 24, and a Z-axis compliance mechanism 25. The RCC 24 has five degrees of freedom in terms of positions and orientations in directions other than a fitting/insertion axis direction.

The RCC 24 is a compliance mechanism that utilizes a restoration force (elastic force) directed in a direction that is opposite to that of distortion of an elastic body, with the center of the distortion of the elastic body being taken as a remote center. Since the robot 21 and the grasping mechanism 20 are connected via the RCC 24, a restoration force is exerted while an external force applied to the grasping mechanism 20 during an assembly operation is absorbed by the distortion of the elastic body, and thereby the automated assembly apparatus can move so as to accord with a corresponding component.

FIGS. 12A and 12B illustrate a magnetic force sensor described in Japanese Patent Laid-Open No. 2004-325328, which is a typical magnetic force sensor. The force sensor includes a magnetic-flux generating source 102, which is embedded in an elastic body disposed so as to be continuous with a plate-like operating portion, and four magnetoelectric transducers 101, which are disposed so as to oppose magnetization directions of the magnetic-flux generating source 102. When a force is applied to the operating portion, the elastic body is elastically deformed, so that the magnetic-flux generating source 102 is displaced. With the displacement of the magnetic-flux generating source 102, the magnetic flux density changes, and the change in density is detected by the magnetoelectric transducers 101. In this manner, the force sensor detects forces in the X-, Y-, and Z-axis directions and moments around the X, Y, and Z axes, the X- and Y-axis directions being directions in which the magnetic-flux generating source 102 is displaced horizontally, i.e., displaced parallel to the plane including the magnetoelectric transducers 101, the Z axis direction being a direction in which the magnetic-flux generating source 102 is displaced perpendicular to the plane.

As illustrated in FIG. 11, a first component 26 has an angular opening portion 26a, and a second component 27 has a shaft portion 27a, onto which the angular opening portion 26a fits and which has angular chamfers. The first component 26 is positioned by a positioning mechanism 28 that is disposed on a stand, which is not illustrated and is disposed adjacent to the automated assembly apparatus. The second component 27 is fed by a component feeding mechanism 29, which is disposed near the automated assembly apparatus, so as to be positioned in a movable range of the automated assembly apparatus.

Now, a fitting operation will be described. Firstly, the robot 21 moves and then the grasping mechanism 20 grasps the second component 27 fed by the component feeding mechanism 29. The robot 21 is driven so as to bring the second component 27 above the first component 26 and then lower the second component 27 so as to fit the second component 27 into the first component 26.

In the process of lowering the second component 27 here, if the second component 27 is axially misaligned with the first component 26 when the second component 27 comes into contact with the first component 26, a force is exerted on the second component 27 from the first component 26. The RCC 24 is elastically deformed by this force and thus the axial misalignment is passively absorbed. Thereafter, calculation is performed to obtain an amount by which and a direction in which the second component 27 has to be moved in order to almost completely eliminate force components orthogonal to the fitting/insertion direction, which have been detected by the four-axis force sensor 23. The robot 21 is moved in the calculated direction so that the second component 27 is axially aligned with the first component 26.

Further, when the rotation axis of the end portion 21a of the robot 21 is defined as a θ axis and the fitting/insertion direction is defined as the Z-axis direction, the first component and the second component are subjected to angle matching by rotating the end portion 21a around the θ axis.

To perform angle matching, a force with which the second component is pressed against the first component is firstly controlled such that a pressing force Fz in the insertion direction (Z-axis direction) that is detected by the force sensor 23 is fixed.

In this state, the value of the pressing force Fz is monitored while the end portion 21a of the robot 21 is rotated around the θ axis. When the end portion 21a comes to a position at which the value of the pressing force Fz is reduced to or below a certain value, the rotation of the robot 21 is stopped and thus the fitting operation is finished.

When the fitting operation is successfully performed, the pressing force Fz directed from the second component to the first component is reduced. By detecting the force reduction, the fitting operation is determined as being successfully performed.

A direction in which the robot 21 is rotated at the time of performing angle matching is determined by a function of a moment reaction force around the fitting/insertion axis that the second component 27 receives from the first component 26. During the rotating operation, when the moment created around the fitting/insertion axis exceeds a predetermined value, an operator immediately stops the operation of the robot 21 by judging that the robot 21 is not rotatable in that direction.

In the case where components are jammed even though the components are made to axially and angularly match with each other in the above described manner, calculation is performed to obtain an amount by which and a direction in which the second component 27 has to be rotated in order to almost completely eliminate the moment reaction force around the fitting/insertion axis that the second component 27 is receiving from the first component 26, and the second component 27 is accordingly rotated to clear the jamming. When the second component 27 is pressed against the first component 26 in this state, the second component 27 is smoothly fitted into the first component 26.

As described above, in the technologies known in the art, the force sensor 23 has to detect the fact that the pressing force Fz in the insertion direction is reduced to below a predetermined value while the fitting/insertion operation is performed in order to detect that performing angle matching of the second component 27 and the first component 26 is complete.

With the recent tendency towards the size reduction of components accompanied by the size reduction of products, a stroke for inserting a component becomes shorter and the insertion is complete immediately. Thus, the pressing force Fz, which has changed once, instantly returns to its original value. For this reason, detection of the change in the pressing force Fz has been made difficult.

Also, in the case where the time taken to insert the second component 27 into the first component 26 is reduced by speeding up an assembly operation, the pressing force Fz instantly returns to its original value since the time taken from when angle matching is complete to when the insertion is complete is short. It is therefore difficult to detect the completion of performing angle matching with the technologies known in the art in the case, for example, where signals from a force sensor are received every 2 ms, or in the case of assembling small components or performing high-speed assembly such that the insertion is complete in a time that is shorter than the interval at which the signals are received.

Thus, it has been difficult to detect the completion of performing angle matching by using the change in the pressing force Fz.

SUMMARY OF THE INVENTION

The present invention provides a method of assembling components that have to be subjected to angle matching by accurately detecting completion of angle matching of the components regardless of the length of time from when angle matching is complete to when insertion is complete during an automated assembly of the components. The present invention also provides an automated assembly apparatus.

A method of assembling components by an automated assembly apparatus according to the present invention is a method of assembling components by using an automated assembly apparatus that includes a grasping mechanism and a force sensor that detects a force and a moment applied to the grasping mechanism. The method includes the steps of, placing a first component in a range within which the automated assembly apparatus is movable, grasping a second component, which is fitted to the first component, by using the grasping mechanism, bringing the second component grasped by the grasping mechanism into contact with the first component, and performing angle matching of the first component and the second component by rotating the first component with respect to the second component around a specific rotation axis, by detecting a moment created around the rotation axis using the force sensor, and by stopping rotating of the first component and the second component when the moment exceeds a predetermined threshold.

An automated assembly apparatus according to the present invention is an automated assembly apparatus including a robot that includes a grasping mechanism and a force sensor that detects a force and a moment applied to the grasping mechanism, a stand on which a first component is disposed, and a controlling unit that controls the robot. A second component grasped by the grasping mechanism is brought into contact with the first component disposed on the stand, a moment created around a specific rotation axis is detected by the force sensor while the first component and the second component are rotated with respect to each other around the rotation axis, and rotation of the first component and the second component is stopped when the moment exceeds a predetermined threshold.

According to an embodiment of the present invention, during an automated assembly of components that have to be subjected to angle matching, the force Fz in an insertion stroke direction is not monitored, but the change of the moment created around the rotation axis is detected during performing angle matching and the rotation is accordingly stopped. Thus, the completion of performing angle matching can be detected with high accuracy. For this reason, it is possible to accurately detect the completion of angle matching of components regardless of the length of time from the timing when angle matching is complete to when insertion is complete.

Further features will become apparent from the following description of exemplary embodiments with reference to the attached drawings.

DESCRIPTION OF THE EMBODIMENTS

Referring to the drawings, an embodiment of the present invention will be described below.

Figure 1:
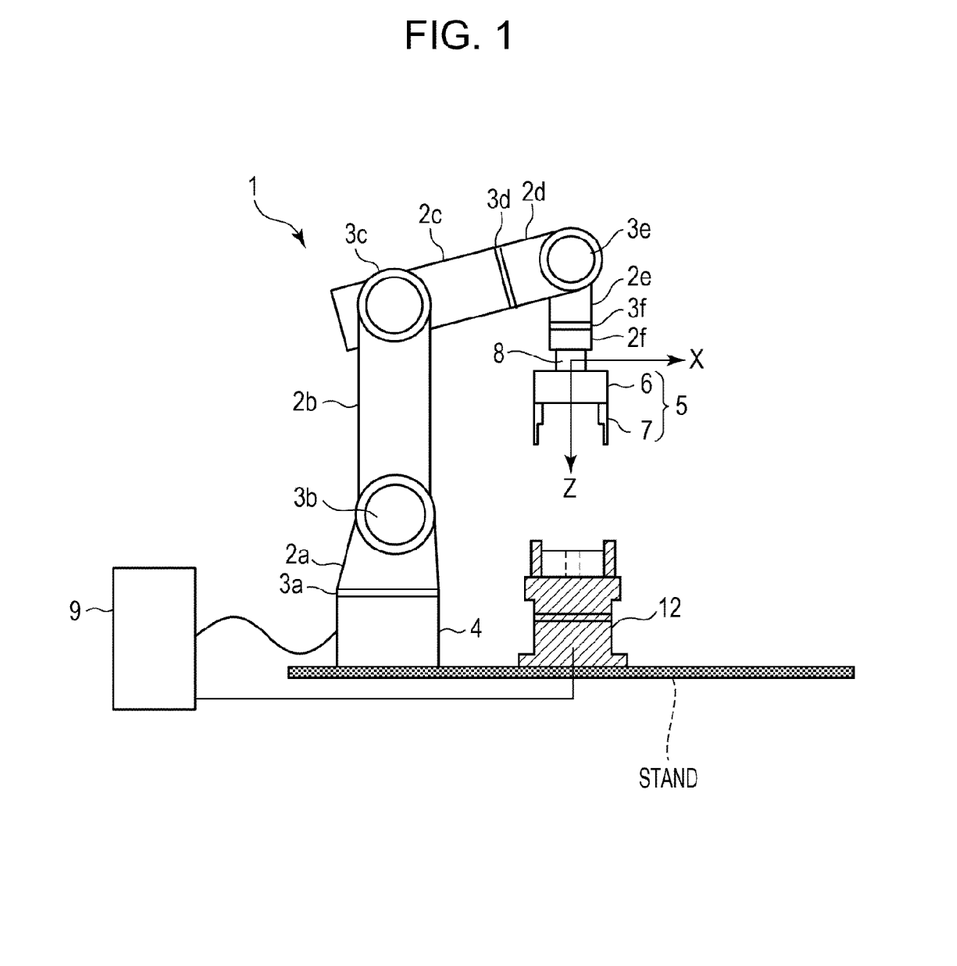
FIG. 1 is a front view of a small automated assembly apparatus.

FIG. 1 is a front view of an apparatus that performs assembly with an automated component-assembly method according to an embodiment of the present invention and schematically illustrates a basic configuration of the apparatus.

As illustrated in FIG. 1, the apparatus that performs assembly with an automated component-assembly method according to the embodiment includes a robot 1 and a grasping mechanism 5. By using the robot 1 and the grasping mechanism 5, the apparatus is capable of grasping a component to be assembled, transporting the component, and assembling the component and another component together.

The robot 1 includes multiple actuators and linkages and has six degrees of freedom. Specifically, first to sixth linkages 2a, 2b, 2c, 2d, 2e, and 2f are connected to each other via rotatable or swivelable first to sixth joints 3a, 3b, 3c, 3d, 3e, and 3f and are driven by corresponding actuators. The actuators are controlled by a controller 9, which is a controlling unit.

In the robot 1, a proximal side of the first linkage 2a is connected to a base portion 4 disposed on a stand with the first joint 3a interposed therebetween. The first joint 3a is a joint that is swivelable around the vertical axis.

A distal side of the first linkage 2a is connected to a proximal side of the second linkage 2b with the second joint 3b interposed therebetween. The second joint 3b is a joint that allows the second linkage 2b to rotate around the horizontal axis. A distal side of the second linkage 2b is connected to a proximal side of the third linkage 2c with the third joint 3c interposed therebetween. The third joint 3c is a joint that allows the third linkage 2c to rotate around the horizontal axis.

Likewise, a distal side of the third linkage 2c is connected to a proximal side of the fourth linkage 2d with the fourth joint 3d interposed therebetween. The fourth joint 3d is a joint that allows the fourth linkage 2d to swivel around the axis of the third linkage 2c. A distal side of the fourth linkage 2d is connected to a proximal side of the fifth linkage 2e with the fifth joint 3e interposed therebetween. The fifth joint 3e is a joint that allows the fifth linkage 2e to rotate around the horizontal axis. A distal side of the fifth linkage 2e is connected to a proximal side of the sixth linkage 2f with the sixth joint 3f interposed therebetween. The sixth joint 3f is a joint that allows the sixth linkage 2f to swivel around the axis of the fifth linkage 2e.

The grasping mechanism 5 is connected to a distal side of the sixth linkage 2f, which may be referred to as a "tip" below, with a force sensor 8 interposed therebetween. The force sensor 8 detects a force and a moment applied to the grasping mechanism 5 to determine completion of assembling of components and to perform a force feedback control and an impedance control.

The grasping mechanism 5 includes multiple grasping claws 7 and has a function of grasping a to-be-assembled component using the grasping claws 7. The grasping mechanism 5 is controlled by the controller 9. A tip coordinate system is determined for the grasping mechanism 5. The tip coordinate system includes a Z axis, which extends along the rotation axis of the swivelable sixth linkage 2f, an X axis that intersects with the Z axis, and a Y axis, which is not illustrated. A direction of the Z axis is often determined as a fitting/insertion direction when an operation of grasping a component and fitting the component to another component is performed.

In this robot 1, the position of the first linkage 2a is controlled by a signal output from the controller 9 such that the first linkage 2a is positioned at a desired position with respect to the base portion 4. Likewise, the positions of the second to sixth linkages 2b to 2f connected to the distal sides of the first to fifth linkages 2a to 3e are controlled by the controller 9. In this manner, the position of the tip is controlled, and the to-be-assembled component grasped by the grasping mechanism 5 that is connected to the tip can be transported to a predetermined position.

A rotary positioning mechanism 12, which is disposed on the stand, can fix and position a component thereto and thereon. The rotary positioning mechanism 12 can also rotate the fixed component in response to a signal transmitted from the controller 9.

Figure 2:
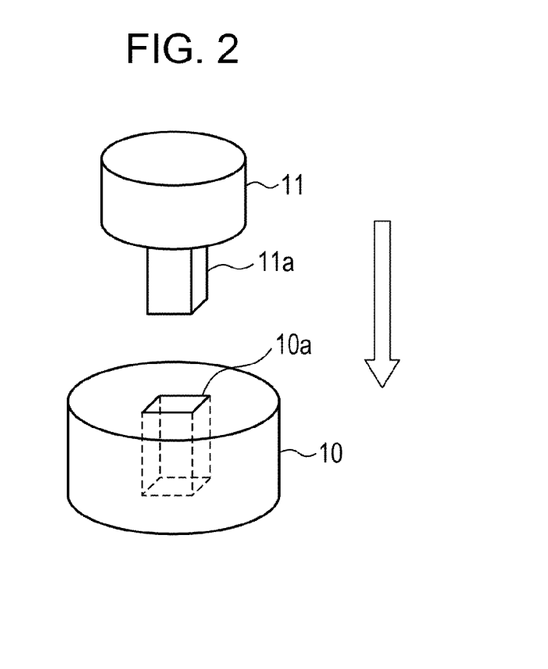
FIG. 2 is a perspective view of components to be assembled together.

FIG. 2 is a perspective view of first and second components 10 and 11 to be assembled together. The first component 10 has an angular opening portion 10a, and the second component 11 has an angular shaft portion 11a that is fitted into the opening portion 10a of the first component 10 while being subjected to angle matching with the angular opening portion 10a.

Figure 3:
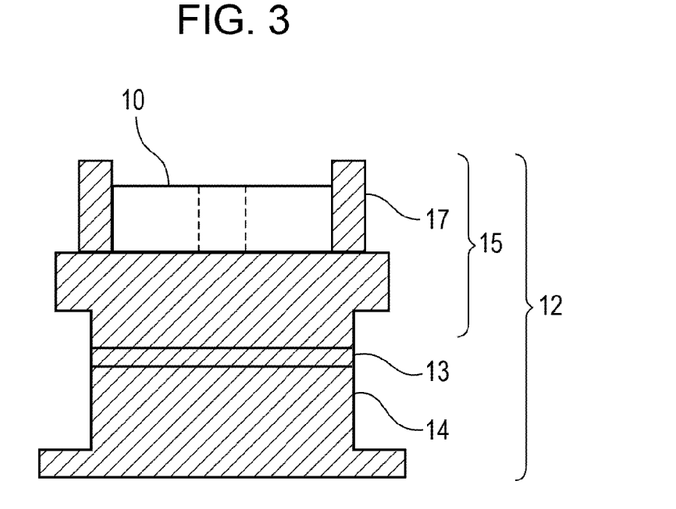
FIG. 3 is a sectional view of a first component and a rotary positioning mechanism for the first component.

FIG. 3 is a sectional view of the first component 10 and the rotary positioning mechanism 12. The rotary positioning mechanism 12 includes a rotary portion 15 and a base portion 14. A proximal side of the rotary portion 15 is connected to the base portion 14 with an actuator 13 interposed therebetween. The actuator 13 allows the rotary portion 15 to swivel around the axis of the base portion 14. The rotary portion 15 includes multiple securing claws 17 on a distal side thereof and has a function of holding the first component 10 using the securing claws 17. The rotary positioning mechanism 12 is controlled by the controller 9.

Figure 4A:
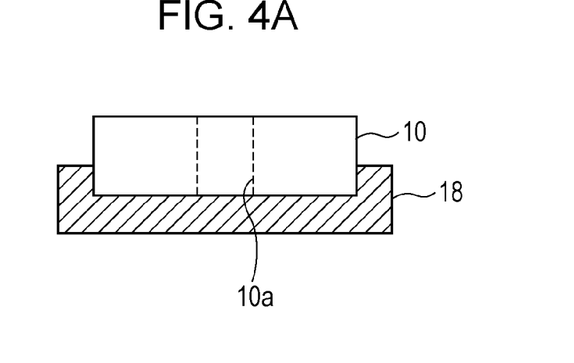
FIGS. 4A and 4B are sectional views of the components to be assembled together and component feeding mechanisms for the components.
Figure 4B:
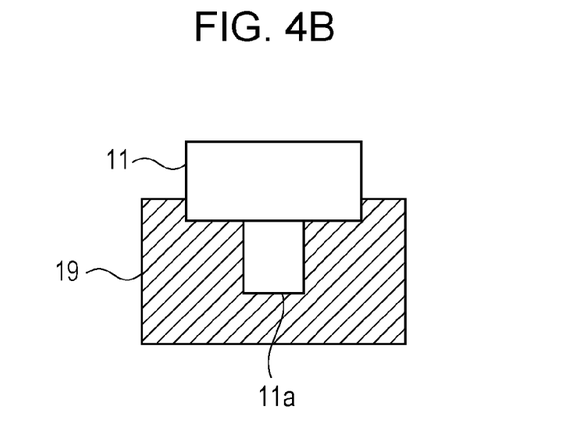

FIGS. 4A and 4B are sectional views of the first and second components 10 and 11 to be assembled together and takeout ends of component feeding mechanisms 18 and 19. Various other mechanisms, such as a publicly known parts feeder, may be adopted as the component feeding mechanisms 18 and 19. The first component feeding mechanism 18 feeds the first component 10 to the apparatus. The second component feeding mechanism 19 feeds the second component 11 to the apparatus.

Figure 5:
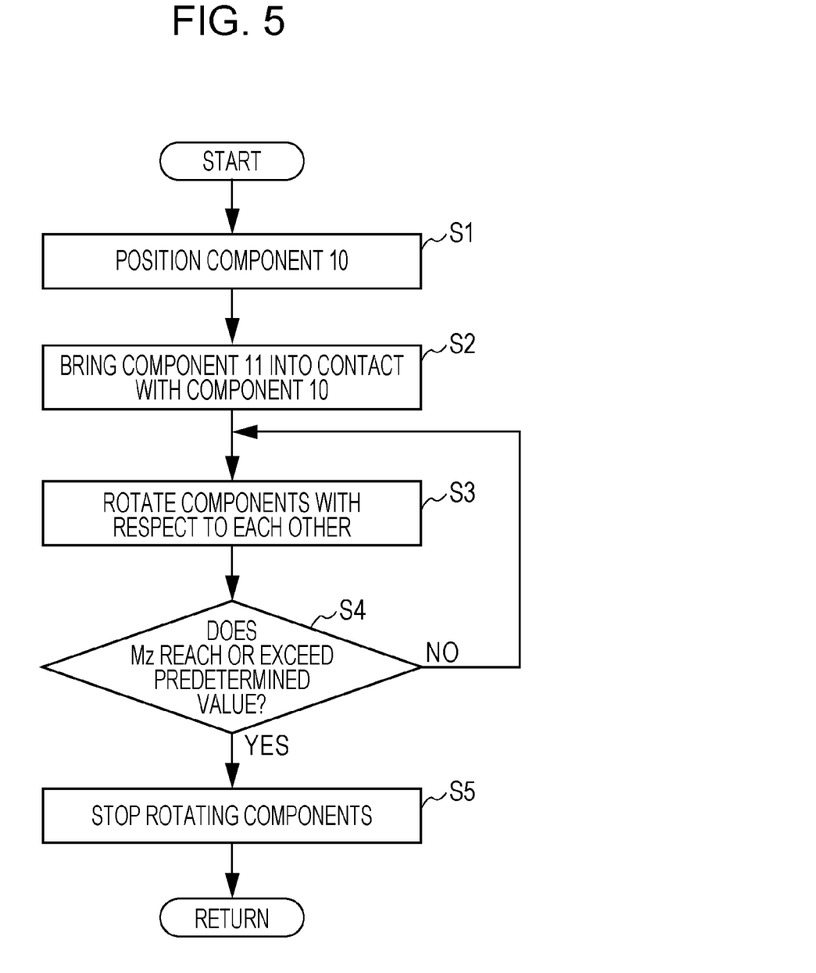
FIG. 5 is a flowchart of an assembly operation.

FIG. 5 is a flowchart of the procedure of an assembly operation according to the embodiment of the present invention.

Firstly, the robot 1 is actuated and the grasping mechanism 5 grasps the first component 10, which has been fed by the first component feeding mechanism 18, with a predetermined grasping force. Thereafter, the robot 1 is moved so as to position the first component 10 grasped by the grasping mechanism 5 on the rotary positioning mechanism 12 (step S1).

Then, the robot 1 is driven and the grasping mechanism 5 grasps the second component 11, which has been fed by the second component feeding mechanism 19. Then the robot 1 is moved to bring the second component 11 above the first component 10. The robot 1 then lowers the second component 11.

Figure 6:
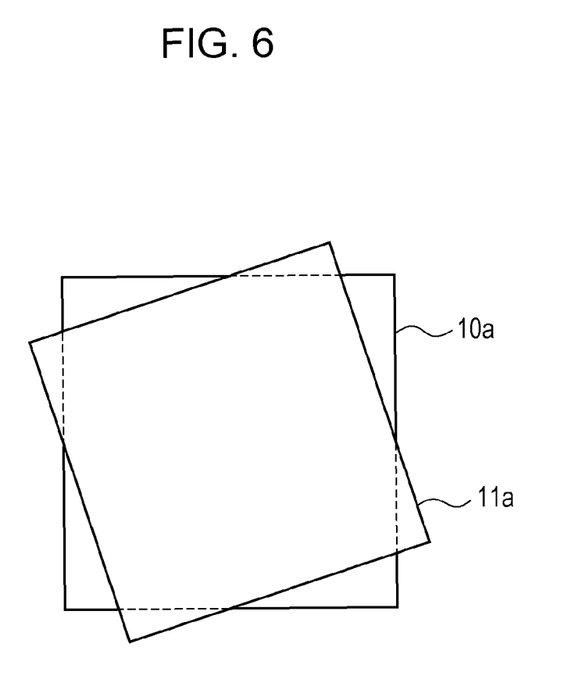
FIG. 6 illustrates how the components are assembled when viewed from above.
Figure 7:
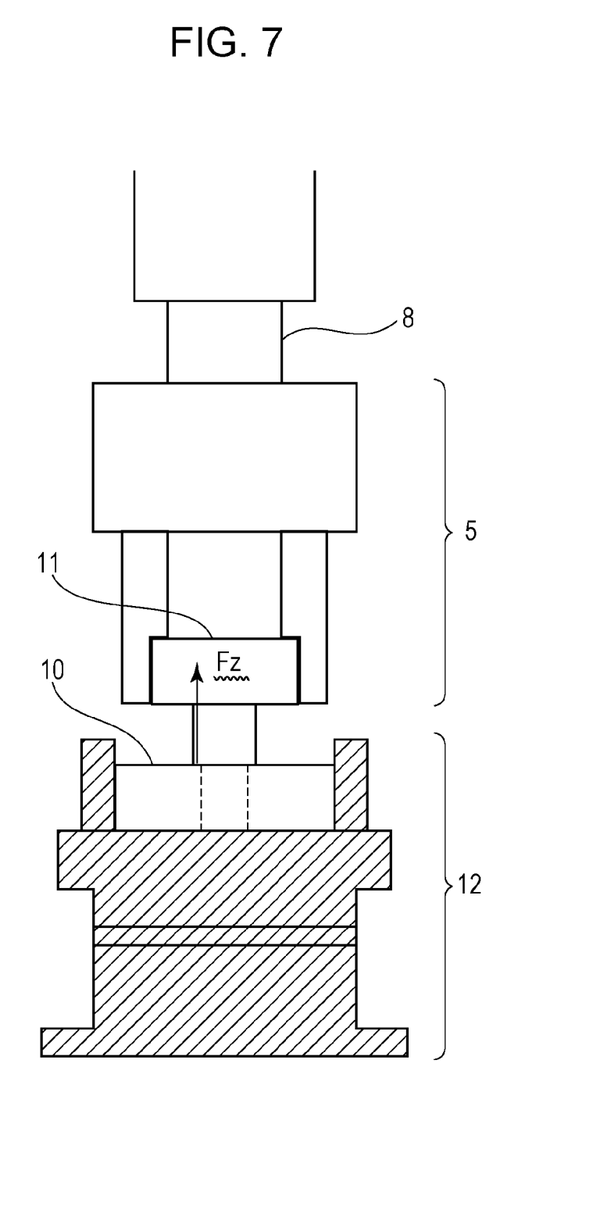
FIG. 7 illustrates how the components are assembled when viewed sideways.

During the process of lowering the second component 11, if the second component 11 is angularly shifted with respect to the first component 10 (FIG. 6), a lower end of the shaft portion 11a of the second component partly comes into contact with an upper end of the opening portion 10a of the first component 10. Consequently, a pressing force Fz in the fitting/insertion axis direction is exerted on the second component 11 (FIG. 7). The pressing force Fz of the robot 1 in the insertion axis direction is controlled so as to fall within a predetermined range, and thus the second component 11 is brought into contact with and pressed against the first component 10 (step S2).

While the second component 11 is pressed against the first component 10 with the specific force, the first component 10 is rotated by the rotary positioning mechanism 12 with respect to the second component 11 (step 3). The rotation of a component with respect to another component may be performed not by the positioning mechanism 12, but by the sixth linkage 2f of the robot 1, instead.

When the force sensor 8 detects that the moment Mz created around the Z axis, which is a fitting/insertion direction, reaches or exceeds a predetermined value, the rotary positioning mechanism 12 is stopped at the current position (step 4 and step 5). In this manner, in the embodiment of the present invention, when the component is fitted or inserted into another component in the Z direction, the force sensor 8 detects the completion of performing angle matching of the components by monitoring the moment Mz, not the pressing force Fz. Thus, the automated assembly of components is achieved.

Figure 8:
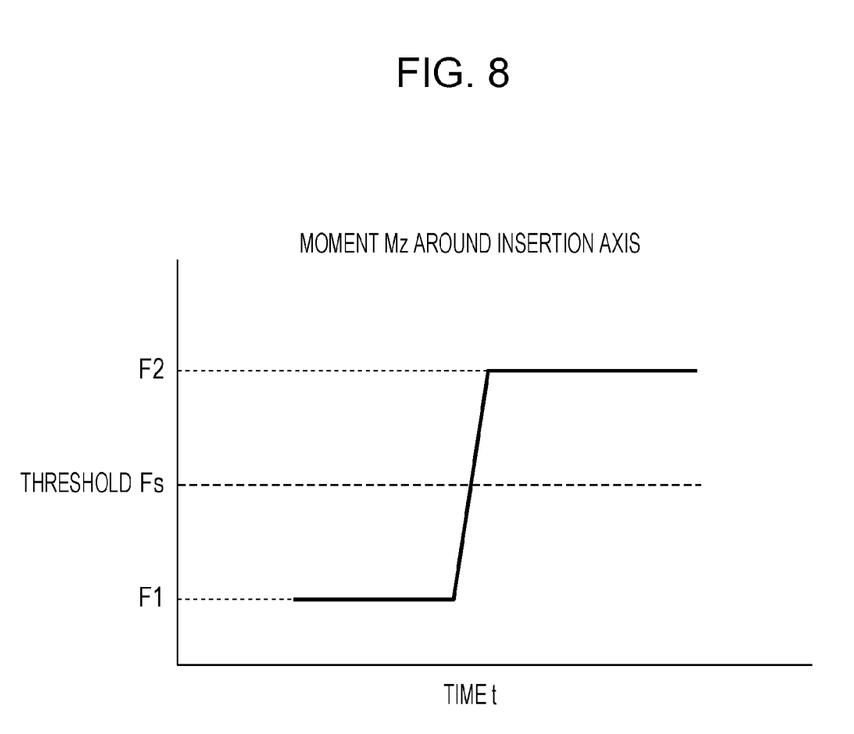
FIG. 8 is a graph of outputs of a force sensor.

Here, a method of detecting completion of performing angle matching by using the force sensor 8 will be described in detail with reference to FIG. 8.

A case is assumed where the second component 11 is grasped by the grasping mechanism 5 and brought into contact with the first component 10 that has been positioned by the rotary positioning mechanism 12. Here, the robot 1 is controlled such that the robot 1 can move forward and backward in the insertion axis direction but not in other axis directions in order to keep the pressing force Fz uniform. In this state, when the first and second components 10 and 11 are rotated with respect to each other by rotating the rotary positioning mechanism 12 or the sixth linkage 2f of the robot 1, the first component 10 rubs against the second component 11. A moment corresponding to the kinetic friction occurring here is referred to as a moment F1.

Subsequently, when the second component 11 and the first component 10 are subjected to angle matching, the shaft portion 11a of the second component 11 is completely inserted into the opening portion 10a of the first component 10. Then, the first component 10 and the second component 11 start rotating integrally and the second component 11 is rubbed against the grasp mechanism 5. A moment corresponding to the kinetic friction occurring here is referred to as a moment F2.

The relationship between the moments F1 and F2 corresponding to these kinetic frictions is generally set such that F1<F2 in the case of an assembly operation. Furthermore, since the grasping force and the pressing force are controlled so as to take fixed values, the values of the moments F1 and F2 become fixed.

In this manner, completion of performing angle matching can be appropriately detected by detecting the values of the moments F1 and F2 corresponding to the kinetic frictions from the moment Mz created around the insertion axis, which has been detected by the force sensor 8, and by determining whether or not the moment Mz has exceeded a set threshold Fs on the basis of the detected sensor outputs. The threshold Fs may be determined so as to fall within a range between the moments F1 and F2.

Figure 9:
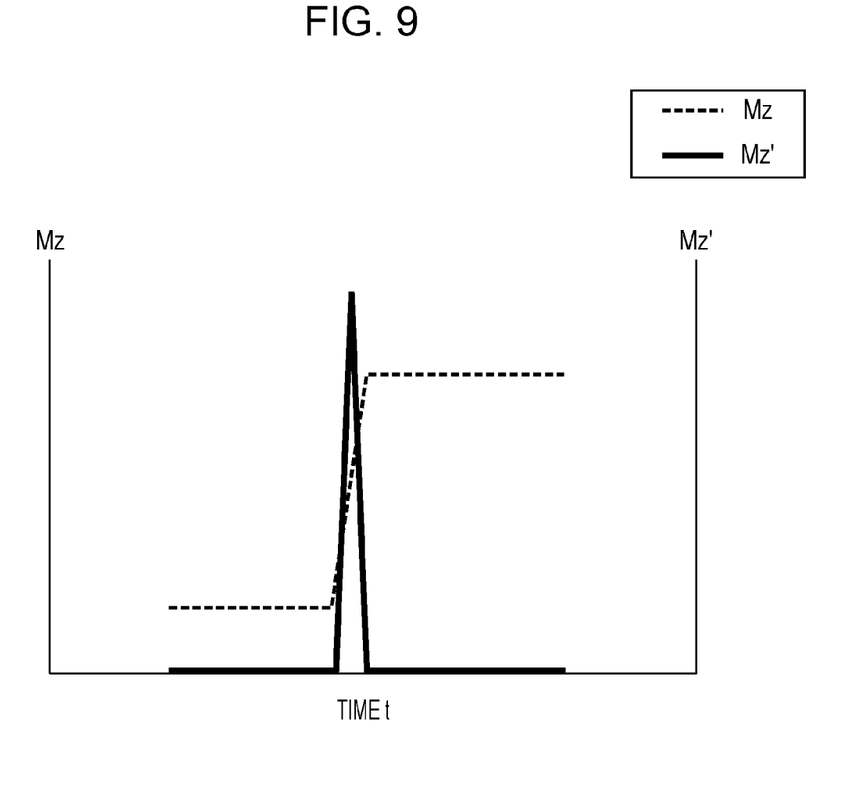
FIG. 9 is a graph of the outputs of the force sensor that have been processed.

In the case where the difference between the moments F1 and F2 is not large enough and thus it is difficult to detect completion of performing angle matching, a time differential value Mz' of an output Mz of the force sensor 8 may be used for detection in addition to the output Mz (FIG. 9). Also in this case, an output Fs' corresponding to the time differential value Mz' may be determined. Since the upper limit of the time differential value Mz' can be calculated in advance from factors such as the shape of a component or a designed takt time of an assembly process of a component, a value that is equal to or lower than the upper limit of the time differential value Mz' may be set as the threshold Fs'.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-139705, filed Jun. 23, 2011, which is hereby incorporated by reference herein in its entirety.

What is claimed is:

1. A method of assembling components by using an automated assembly apparatus that includes a grasping mechanism and a force sensor that detects a force and a moment applied to the grasping mechanism, the method comprising the steps of:
    placing a first component in a range within which the automated assembly apparatus is movable;
    grasping a second component which is to be fitted to the first component, by using the grasping mechanism;
    bringing the second component grasped by the grasping mechanism into contact with the first component; and
    performing an angle matching of the first component and the second component by detecting a moment created around a specific rotation axis using the force sensor while rotating the first component and the second component with respect to each other around the specific rotation axis, and by stopping the rotation of the first component and the second component with respect to each other when the moment exceeds a predetermined threshold to detect that assembly of the first component and the second component is complete,
    wherein in the step of performing the angle matching, the first component and the second component are not rotated when a time differential value of the moment exceeds a predetermined threshold.

2. An automated assembly apparatus comprising:
    a robot that includes a grasping mechanism and a force sensor that detects a force and a moment applied to the grasping mechanism;
    a stand on which a first component is disposed; and
    a controlling unit that controls the robot,
    wherein a second component grasped by the grasping mechanism is brought into contact with the first component disposed on the stand, a moment created around a specific rotation axis is detected by the force sensor while the first component and the second component are rotated with respect to each other around the specific rotation axis, and the rotation of the first component and the second component with respect to each other is stopped when the moment exceeds a predetermined threshold to detect that assembly of the first component and the second component is complete,
    wherein the first component and the second component are not rotated when a time differential value of the moment exceeds a predetermined threshold.

3. The automated assembly apparatus according to claim 2, wherein the stand includes a positioning mechanism that is rotatable with respect to the grasping mechanism.

* * * * *